US012006839B2

(12) United States Patent
Nakamura et al.

(10) Patent No.: US 12,006,839 B2
(45) Date of Patent: Jun. 11, 2024

(54) TURBINE ROTOR BLADE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shinichiro Nakamura, Kawasaki Kanagawa (JP); Kenji Kamimura, Yokohama Kanagawa (JP); Tsuyoshi Ogawa, Yokohama Kanagawa (JP); Daiki Tanaka, Yokohama Kanagawa (JP); Shinsaku Amano, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/391,228

(22) Filed: Aug. 2, 2021

(65) Prior Publication Data

US 2022/0282624 A1 Sep. 8, 2022

(30) Foreign Application Priority Data

Mar. 8, 2021 (JP) ................................ 2021-036320

(51) Int. Cl.
*F01D 5/22* (2006.01)
*F01D 5/14* (2006.01)
(Continued)

(52) U.S. Cl.
CPC ............... *F01D 5/22* (2013.01); *F01D 5/141* (2013.01); *F01D 5/005* (2013.01); *F01D 5/225* (2013.01);
(Continued)

(58) Field of Classification Search
CPC ... F01D 5/225; F01D 5/20; F01D 5/22; F01D 5/14; F01D 5/141; F01D 5/143;
(Continued)

(56) References Cited

U.S. PATENT DOCUMENTS 6,146,098 A * 11/2000 Fukuno ..................... F01D 5/18 416/191
6,164,916 A * 12/2000 Frost ....................... F01D 5/225 148/528
(Continued)

FOREIGN PATENT DOCUMENTS

JP 6614467 B2 12/2019
WO WO-2017/179711 A1 10/2017

*Primary Examiner* — Justin D Seabe
*Assistant Examiner* — Behnoush Haghighian
(74) *Attorney, Agent, or Firm* — Foley & Lardner LLP

(57) ABSTRACT

A rotor blade in an embodiment includes: a suction surface side projecting portion projecting from a suction surface on a leading edge side at a blade tip of the blade effective portion; and a pressure surface side projecting portion projecting from a pressure surface on a trailing edge side at the blade tip of the blade effective portion. The suction surface side projecting portion includes: a leading edge side end surface including a contact surface that comes into contact with the pressure surface side projecting portion of the adjacent rotor blade and a non-contact surface that does not come into contact with the pressure surface side projecting portion of the adjacent rotor blade during rotation; a groove portion formed from the non-contact surface to the trailing edge side; and a joining member joined to the groove portion, the joining member being formed of an erosion-resistance material.

9 Claims, 9 Drawing Sheets

(51) Int. Cl.
*F01D 5/00* (2006.01)
*F01D 5/30* (2006.01)

(52) U.S. Cl.
CPC ...... *F01D 5/3007* (2013.01); *F05D 2240/307* (2013.01)

(58) Field of Classification Search
CPC ........ F01D 5/147; F01D 5/3007; F01D 11/08; F05D 2240/307; F05D 2240/81; B23K 1/0018; B23K 2101/001
USPC .................................................. 228/245–262
See application file for complete search history.

(56) References Cited

U.S. PATENT DOCUMENTS

| | | | | | |
|---|---|---|---|---|---|
| 6,568,908 | B2 * | 5/2003 | Namura | F01D 5/225 | 416/190 |
| 7,771,171 | B2 * | 8/2010 | Mohr | F01D 5/225 | 416/212 A |
| 8,096,767 | B1 * | 1/2012 | Liang | F01D 5/225 | 415/115 |
| 8,186,959 | B2 * | 5/2012 | Iwai | F01D 5/225 | 416/191 |
| 8,703,044 | B2 * | 4/2014 | Sathian | F01D 5/225 | 428/668 |
| 9,542,739 | B1 * | 1/2017 | Salm | G06T 19/00 | |
| 10,570,754 | B2 * | 2/2020 | Tabata | C23C 4/08 | |
| 10,598,030 | B2 * | 3/2020 | Kottilingam | B23K 20/021 | |
| 10,934,847 | B2 * | 3/2021 | Danno | F01D 25/16 | |
| 11,286,785 | B2 * | 3/2022 | Hirata | F01D 5/288 | |
| 2004/0124231 | A1 * | 7/2004 | Hasz | B23K 35/3046 | 228/245 |
| 2009/0202344 | A1 * | 8/2009 | Bruce | F01D 5/225 | 415/198.1 |
| 2010/0068061 | A1 * | 3/2010 | Iwai | F01D 5/225 | 416/179 |
| 2012/0195766 | A1 * | 8/2012 | Cohin | F01D 5/225 | 416/241 A |
| 2012/0231295 | A1 * | 9/2012 | Kottilingam | B23K 35/304 | 428/668 |
| 2014/0140807 | A1 * | 5/2014 | Gumpina | F01D 5/225 | 415/182.1 |
| 2014/0140841 | A1 * | 5/2014 | Gumpina | F01D 5/225 | 416/179 |
| 2016/0237822 | A1 * | 8/2016 | Bischof | F01D 5/225 | |
| 2018/0345396 | A1 * | 12/2018 | Kottilingam | B22F 7/064 | |
| 2019/0101000 | A1 * | 4/2019 | Danno | F01D 5/14 | |
| 2020/0384560 | A1 * | 12/2020 | Rebbecchi, Jr. | B23K 1/20 | |
| 2022/0154583 | A1 * | 5/2022 | Okajima | F01D 5/20 | |

* cited by examiner

TURBINE ROTOR BLADE

CROSS REFERENCE TO RELATED APPLICATIONS

This application is based upon and claims the benefit of priority from Japanese Patent Application No. 2021-036320, filed on Mar. 8, 2021; the entire contents of which are incorporated herein by reference.

FIELD

Embodiments described herein relate generally to a turbine rotor blade.

BACKGROUND

In thermal power generation facilities including steam turbines, long blades of 1 m or more have been applied to the final stage of a low-pressure turbine as a measure to increase efficiency. A large centrifugal force is applied to rotor blades made of long blades in the final stage. Such rotor blades in the final stage are formed of a steel type with excellent strength and toughness.

The rotor blades in the final stage of a low-pressure turbine are rotated and driven at high speed by wet steam, which is a working fluid. As a result, droplets repeatedly collide with the rotor blades at high speed, causing droplet erosion that erodes the surface of the rotor blades.

A leading edge portion of the rotor blade is expected to be significantly eroded by the collision of droplets. For this reason, a measure to increase the hardness of the leading edge portion by quenching, for example, has been applied to conventional rotor blades. In addition, to conventional rotor blades, a measure to join a member, which is formed of a material more excellent in erosion resistance than a material forming the rotor blade, to the leading edge portion has been applied.

FIG. 14 is a plan view of a part of tips of rotor blades 300 in the final stage in a conventional low-pressure turbine when viewed from the outer periphery side.

A twisted blade is used as the long rotor blade 300. A blade effective portion of the twisted blade is twisted from a blade root to a blade tip.

As illustrated in FIG. 14, the tip of the rotor blade 300 includes a suction surface side projecting portion 310 projecting from a suction surface and a pressure surface side projecting portion 320 projecting from a pressure surface. The suction surface side projecting portion 310 is located on the leading edge side of the rotor blade 300, and the pressure surface side projecting portion 320 is located on the trailing edge side of the rotor blade 300. A leading edge 301 and a trailing edge 302 of the rotor blade 300 are also illustrated in FIG. 14.

When the rotor blades 300 are implanted in the circumferential direction of a turbine rotor, the suction surface side projecting portion 310 is adjacent to the pressure surface side projecting portion 320 of the adjacent rotor blade 300 in the circumferential direction.

Then, during rotation, the rotor blades 300 twist back (untwist), and as illustrated in FIG. 14, a contact surface 311 of the suction surface side projecting portion 310 and a contact surface 321 of the pressure surface side projecting portion 320 of the rotor blades 300 adjacent to each other come into contact. This constitutes a whole-periphery single-unit coupled structure.

In recent years, it has been reported that, in addition to the leading edge 301, an end surface 312 other than the contact surface 311 of the end surface of the suction surface side projecting portion 310 on the leading edge side is eroded in the rotor blade 300 in such a configuration. This end surface 312 is located at a root portion 313 of the suction surface side projecting portion 310 on the suction surface side.

During rotation, this end surface 312 collides directly with a working fluid containing droplets because of being exposed without being in contact with the pressure surface side projecting portion 320. This causes droplet erosion on the end surface 312.

FIG. 14 schematically illustrates an erosion state of the end surface 312. Erosion 330 progresses from the end surface 312 towards the trailing edge side. Plural pieces of wedge-shaped erosion 330 occur in the entire end surface 312. Therefore, when viewed in the blade height direction (radial direction), the erosion 330 is made to penetrate the suction surface side projecting portion 310.

A width We of the erosion 330 matches the width of the exposed end surface 312. The width We of the erosion 330 does not vary significantly even if the years of use are prolonged. On the other hand, a depth De of the wedge-shaped erosion increases with the years of use. A contact reaction force from the pressure surface side projecting portion 320 of the adjacent rotor blade 300 acts on the root portion 313, and thus, the possibility of the suction surface side projecting portion 310 being scattered increases as the erosion progresses.

Here, the width We of the erosion 330 is the width of the erosion 330 on a virtual extension line of the contact surface 311. The depth De of the erosion 330 is the distance between the virtual extension line of the contact surface 311 and the most leading end of the erosion 330 in the direction vertical to this virtual extension line.

Conventionally, the rotor blade 300 with erosion that has progressed in the root portion 313 of the suction surface side projecting portion 310 is replaced with a new blade.

In the meantime, there have been studied techniques to inhibit such erosion in the root portion 313 of the suction surface side projecting portion 310. For example, in the conventional erosion inhibition technique of a rotor blade, during a casting process, a step portion is formed on the surface of a blade main body where erosion is to occur, and a plate member with excellent erosion resistance is fitted to the step portion. This erosion inhibition technique has been applied to new blades.

There is considered a method of removing an eroded portion by machining and then performing build-up welding on a portion from which the eroded portion has been removed for the rotor blade 300 with erosion that has progressed in the root portion 313 of the suction surface side projecting portion 310.

However, during build-up welding, the vicinity of a built-up portion deforms significantly due to a large heat input to the suction surface side projecting portion 310. Therefore, the deformation causes the deviation of the dimensional control standard functionally required for the suction surface side projecting portion 310. As a result, the suction surface side projecting portion 310 fails to appropriately come into contact with the pressure surface side projecting portion 320 of the adjacent rotor blade 300 during rotation.

For this reason, conventionally, the rotor blade 300 with erosion that has progressed in the root portion 313 of the suction surface side projecting portion 310 is replaced with a new blade. In this case, a long manufacturing period is required because the new blade is remanufactured from a cast material. In addition, this rotor blade 300 is discarded, although the portion other than the root portion 313 where erosion has occurred can be used continuously. The conventional measure for such a rotor blade 300 in which erosion has progressed is not preferable from an economic point of view.

Further, even if the above-described conventional erosion inhibition technique in which the plate member is fitted to the step portion on the surface of the rotor blade is applied, the erosion progresses over time. It is difficult to repair and reuse the rotor blade with the erosion that has progressed up to the step portion because it is impossible to form the step portion again.

DETAILED DESCRIPTION

Hereinafter, there will be explained an embodiment of the present invention with reference to the drawings.

In one embodiment, a turbine rotor blade includes: a blade effective portion including a leading edge and a trailing edge at a boundary between a suction surface and a pressure surface; a suction surface side projecting portion projecting from the suction surface on a leading edge side at a tip of the blade effective portion; and a pressure surface side projecting portion projecting from the pressure surface on a trailing edge side at the tip of the blade effective portion.

The suction surface side projecting portion includes: a leading edge side end surface on the leading edge side, including a contact surface and a non-contact surface, which contacts with the pressure surface side projecting portion of the adjacent turbine blade on the contact surface during rotation; a groove portion that penetrates in a blade height direction, with a width in a projecting direction to narrow from the non-contact surface to the trailing edge side; and a joining member configured to be joined to the groove portion and formed of a material that is more excellent in erosion resistance than a material forming the turbine rotor blade.

Figure 1:
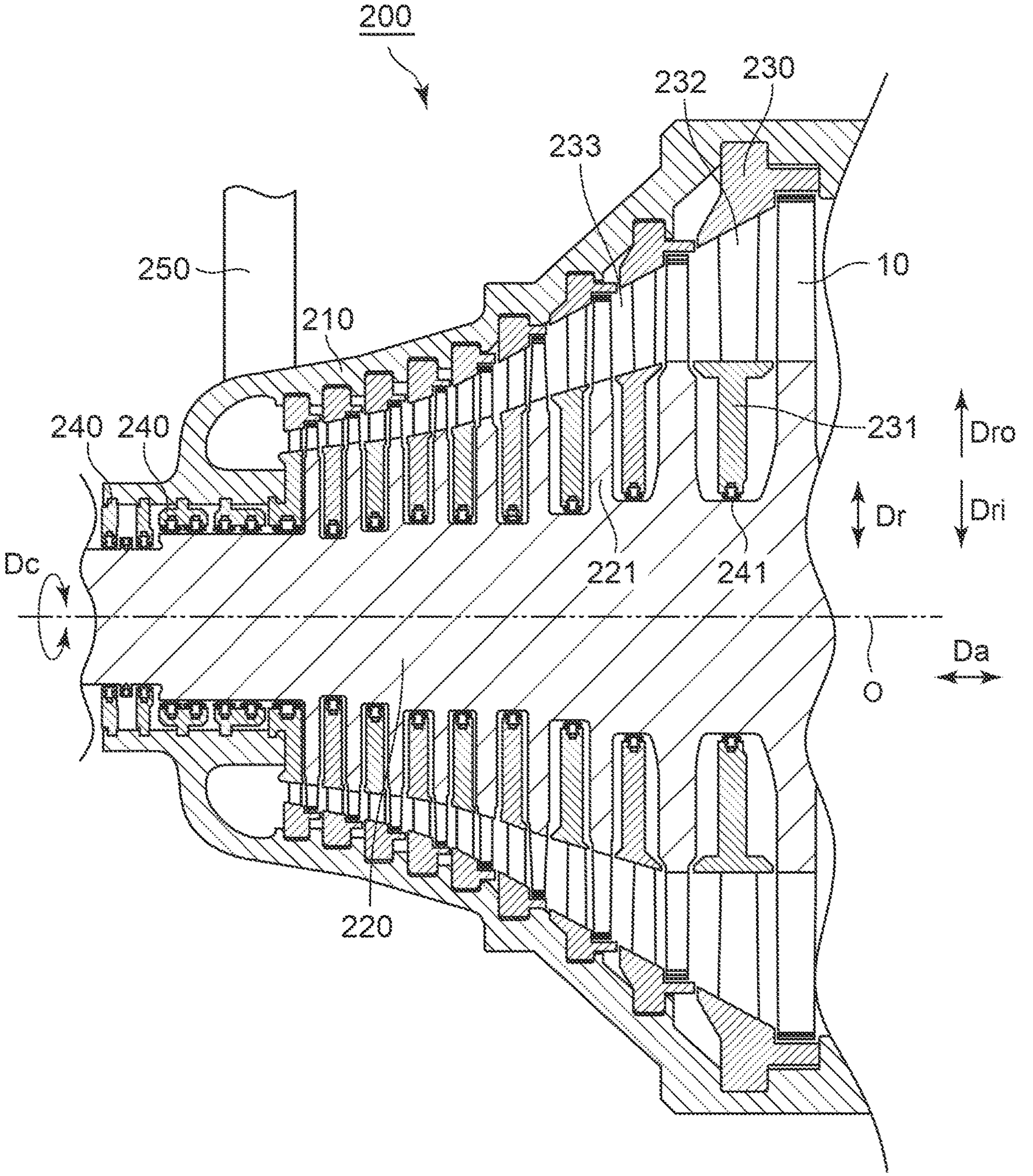
FIG. 1 is a view illustrating a meridian cross section of a steam turbine including rotor blades in an embodiment in a vertical direction.

FIG. 1 is a view illustrating a meridian cross section of a steam turbine 200 including rotor blades 10 in an embodiment in a vertical direction. The steam turbine 200 is a low-pressure turbine with long blades in the final stage, which is the final stage of turbine stages.

The rotor blade 10 in the embodiment is provided in the final stage, and so on, for example. The rotor blade 10 in the embodiment can be used not only in the final stage but also in the turbine stage in which droplets contained in a working fluid collide with the rotor blade at high speed. For the turbine stages other than the turbine stage with the rotor blades 10 in the embodiment provided therein, a rotor blade with specifications generally used as a rotor blade of a steam turbine is used.

As illustrated in FIG. 1, the steam turbine 200 includes a casing 210. A turbine rotor 220 is provided to penetrate through the casing 210. Rotor wheels 221 are formed on the turbine rotor 220. The turbine rotor 220 is rotatably supported by not-illustrated rotor bearings.

The rotor wheel 221 projects to a radially outer side Dro from an outer peripheral surface of the turbine rotor 220 over a circumferential direction Dc. The rotor wheel 221 is formed in a plurality of stages along a center axis direction of the turbine rotor 220.

Here, the center axis direction of the turbine rotor 220 is referred to as an axial direction Da simply below. The radially outer side Dro is the side that is going away from a center axis O of the turbine rotor 220 in a radial direction Dr. A radially inner side Dri is the side approaching the center axis O in the radial direction Dr (the center axis side). The radial direction Dr is the direction vertical to the center axis O, with the center axis O set as a base point. The circumferential direction Dc is the circumferential direction centered on the center axis O of the turbine rotor 220, that is, the direction around the center axis O.

The rotor blade 10 is inserted from the axial direction Da in this rotor wheel 221, for example. Then, a plurality of the rotor blades 10 are installed in the circumferential direction Dc of the rotor wheel 221 to form a rotor blade cascade. The rotor blade cascade is formed in a plurality of stages in the axial direction Da.

A diaphragm outer ring 230 is installed on the inner periphery of the casing 210, and a diaphragm inner ring 231 is installed at the inner side (radially inner side Dri) of the diaphragm outer ring 230. Between the diaphragm outer ring 230 and the diaphragm inner ring 231, a plurality of stator blades 232 are installed in the circumferential direction Dc to form a stator blade cascade.

This stator blade cascade and the rotor blade cascade are provided alternately in a plurality of stages in the axial direction Da. Then, the stator blade cascade and the rotor blade cascade located immediately downstream from the stator blade cascade form a turbine stage.

Here, the downstream side means a downstream side of the main flow direction of a working fluid in the axial direction Da. The upstream side means an upstream side of the main flow direction of the working fluid in the axial direction Da.

Between the diaphragm outer ring 230 and the diaphragm inner ring 231, an annular steam passage 233 through which main steam flows is formed.

Between the turbine rotor 220 and the casing 210, gland sealing parts 240 are provided in order to prevent steam from leaking to the outside. Further, between the turbine rotor 220 and the diaphragm inner ring 231, a sealing part 241 is provided in order to prevent steam from passing downstream therebetween.

Further, in the steam turbine 200, a steam inlet pipe (not illustrated) is provided through the casing 210 to introduce steam from a crossover pipe 250 into the steam turbine 200. An exhaust passage (not illustrated) is provided downstream of the final stage to exhaust the steam expanded in the turbine stage. This exhaust passage communicates with a steam condenser (not illustrated).

Next, a configuration of the rotor blade 10 in the embodiment is explained.

Figure 2:
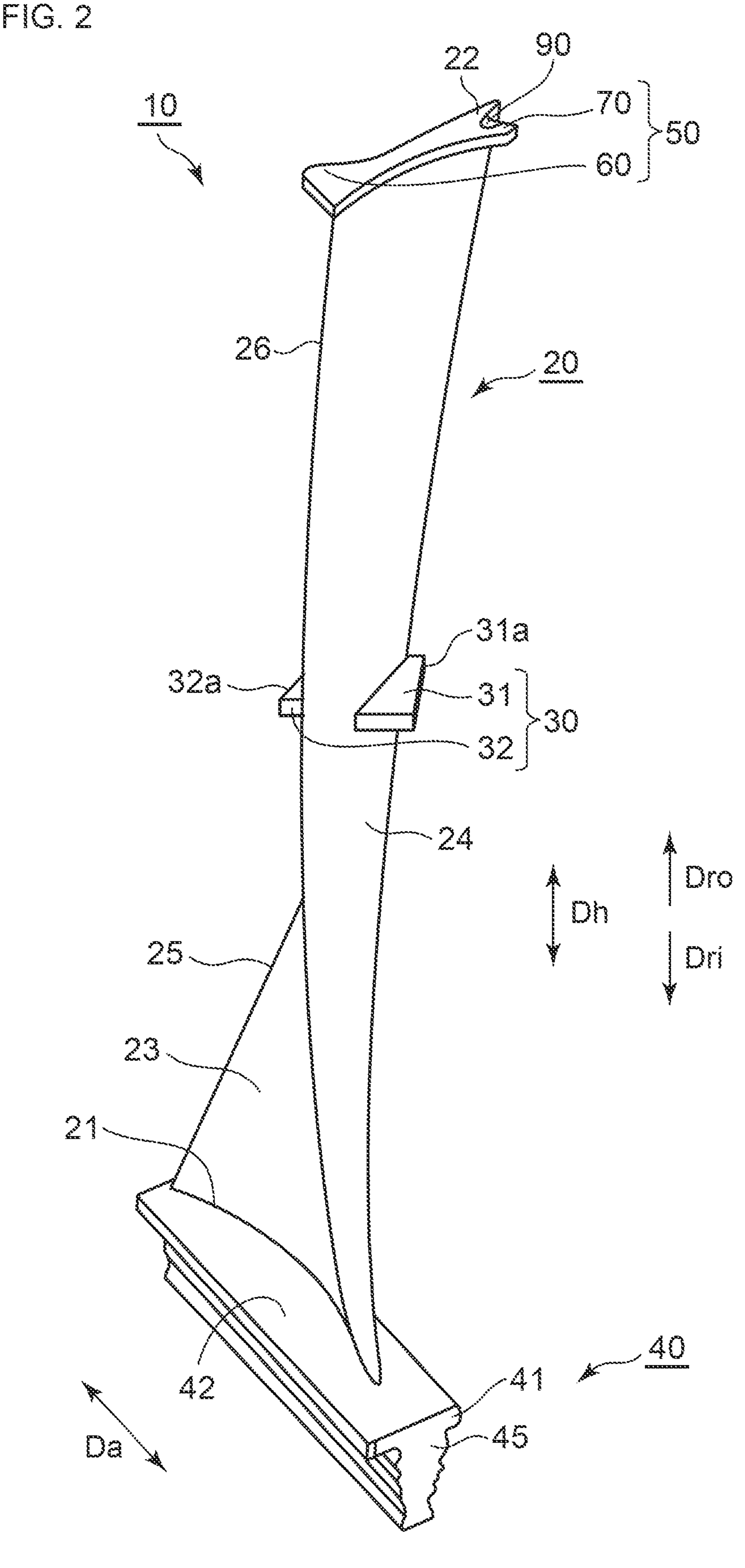
FIG. 2 is a perspective view of the rotor blade in the embodiment.
Figure 3:
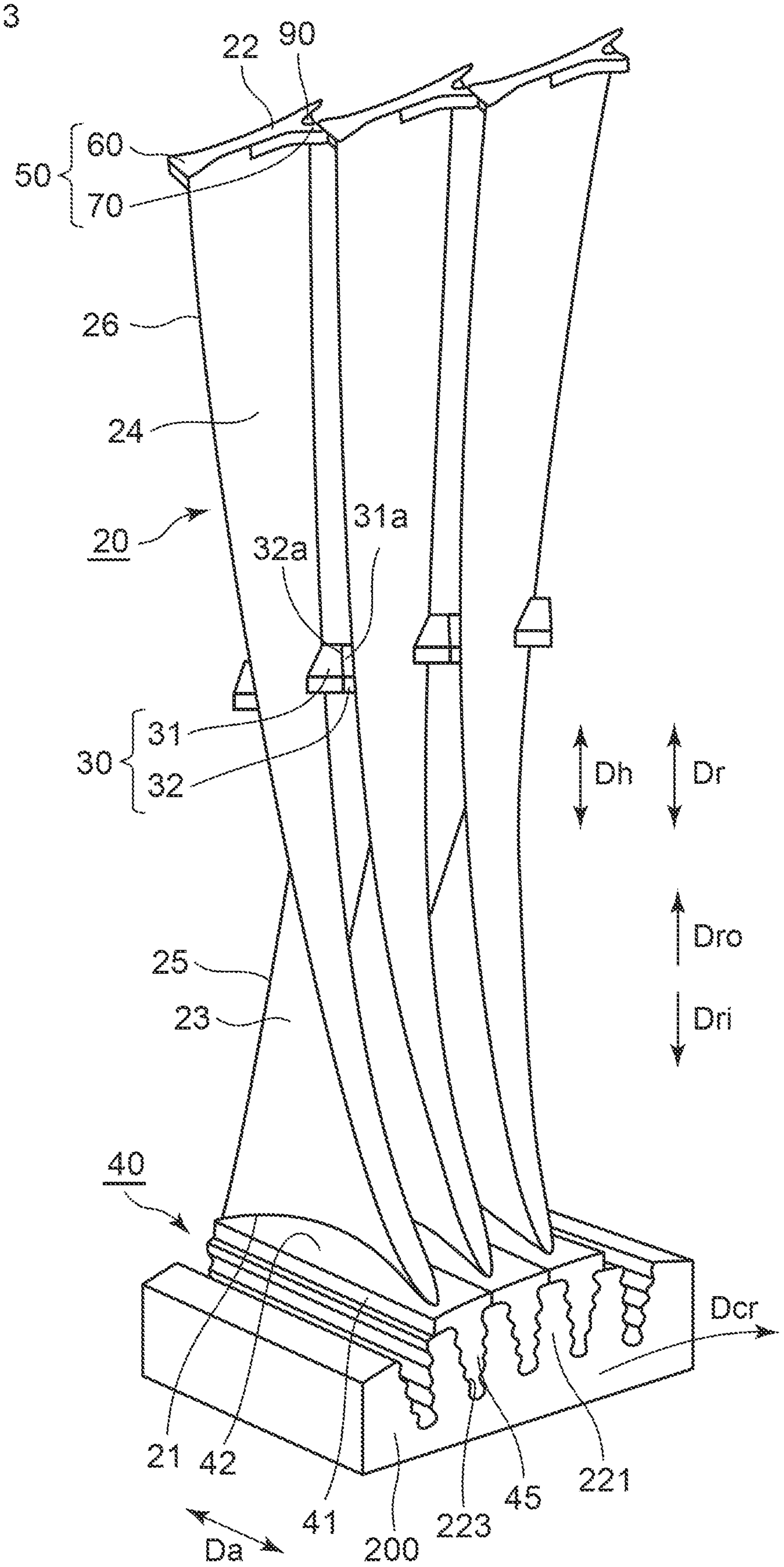
FIG. 3 is a perspective view illustrating a state where a plurality of the rotor blades in the embodiment are implanted in rotor wheels over a circumferential direction.

FIG. 2 is a perspective view of the rotor blade 10 in the embodiment. FIG. 3 is a perspective view illustrating a state where a plurality of the rotor blades 10 in the embodiment are each implanted between the rotor wheels 221 over the circumferential direction Dc.

In FIG. 3, a rotation direction Dcr of the turbine rotor 220 is shown by an arrow. The rotation direction Dcr is one direction of the circumferential direction Dc. Further, a sealing member for preventing leakage of steam between a blade tip 22 and the diaphragm outer ring 230 is provided on an outer peripheral surface of the blade tip 22 of the rotor blade 10 on the radially outer side Dro, but the sealing member is omitted in the drawing where this embodiment is illustrated.

The rotor blade 10 in the embodiment is a long blade of 1 m or more, for example. Here, as the rotor blade 10, the rotor blade in the final stage is explained as an example.

As illustrated in FIG. 2, the rotor blade 10 includes a blade effective portion 20, a blade implantation portion 40, and a projecting portion 50.

The blade effective portion 20 is a blade portion extending from a blade root 21 to the blade tip 22. The blade effective portion 20 is twisted from the blade root 21 to the blade tip 22. The blade effective portion 20 extends to the radially outer side Dro. Here, the direction in which this rotor blade 10 extends is defined as a blade height direction Dh. The blade height direction Dh is synonymous with the radial direction Dr in a state where the rotor blade 10 is implanted between the rotor wheels 221.

The blade tip 22 is a tip portion of the blade effective portion 20 in the blade height direction Dh. The blade root 21 is a root portion of the blade effective portion 20 in the blade height direction Dh.

The blade effective portion 20 includes a concave pressure surface 23 and a convex suction surface 24 from the blade root 21 to the blade tip 22. At an upstream end portion of the blade effective portion 20, a leading edge 25 is formed. At a downstream end portion of the blade effective portion 20, a trailing edge 26 is formed.

The leading edge 25 is where the pressure surface 23 and the suction surface 24 are connected on the upstream side in the axial direction Da in a cross section perpendicular to the blade height direction Dh. That is, the leading edge 25 is formed over the blade height direction Dh at the boundary between the pressure surface 23 and the suction surface 24 on the upstream side in the axial direction Da.

The trailing edge 26 is where the pressure surface 23 and the suction surface 24 are connected on the downstream side in the axial direction Da in the cross section perpendicular to the blade height direction Dh. That is, the trailing edge 26 is formed over the blade height direction Dh at the boundary between the pressure surface 23 and the suction surface 24 on the downstream side in the axial direction Da.

In the rotor blade cascade including a plurality of the rotor blades 10 illustrated in FIG. 3 in the circumferential direction, steam passes through between the blade effective portions 20 of the adjacent rotor blades 10.

In the rotor blade 10, as illustrated in FIG. 2 and FIG. 3, an intermediate coupling member 30 may be provided at a predetermined height position of the blade effective portion 20 in the blade height direction Dh (radial direction Dr). The intermediate coupling member 30 is provided at the intermediate position between the blade root 21 and the blade tip 22 in the blade height direction Dh, for example. The intermediate coupling member 30 includes a suction surface coupling member 31 projecting from the suction surface 24 of the blade effective portion 20 and a pressure surface coupling member 32 projecting from the pressure surface 23 of the blade effective portion 20.

The intermediate coupling member 30 is formed integrally with the blade effective portion 20, for example. The structure of the intermediate coupling member 30 is not limited in particular. As the structure of the intermediate coupling member 30, a structure that is widely employed as a coupling part of twisted blades can be applied.

During rotation of the turbine rotor 220, twisting back (untwisting) occurs in the blade effective portion 20. This untwisting causes a contact between a contact surface 31*a* of the suction surface coupling member 31 of the rotor blade 10 and a contact surface 32*a* of the pressure surface coupling member 32 of the rotor blade 10 adjacent to this rotor blade 10 on the suction surface side, as illustrated in FIG. 3.

The blade implantation portion 40 is formed on the radially inner side Dri of the blade effective portion 20 as illustrated in FIG. 2 and FIG. 3. The blade implantation portion 40 includes a platform 41 and a blade root portion 45.

The platform 41 is formed between the blade effective portion 20 and the blade root portion 45. The blade root 21 of the blade effective portion 20 is located on an outer peripheral surface 42 of the platform 41 on the radially outer side Dro. The platform 41 is formed in a plate shape, for example.

The blade root portion 45 is formed on the radially inner side Dri of the platform 41. The blade root portion 45 is formed in the shape of a Christmas tree, for example, in an axial entry type in which the blade root portion 45 is implanted in the axial direction Da. The blade root portion 45 is inserted into an implantation groove 223 in the rotor wheel 221 from the axial direction Da to be fixed, as illustrated in FIG. 3.

Such a Christmas tree-shaped blade root portion 45 in the axial entry type is suitable for a long blade to which a large centrifugal force is applied.

Next, the configuration of the projecting portion 50 is explained.

Figure 4:
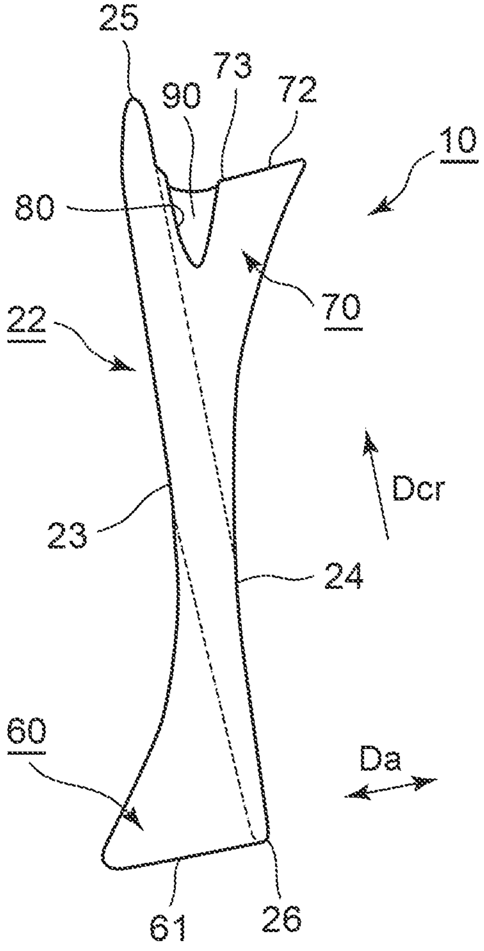
FIG. 4 is a plan view of a blade tip of the rotor blade in the embodiment when viewed from the outer periphery side.
Figure 5:
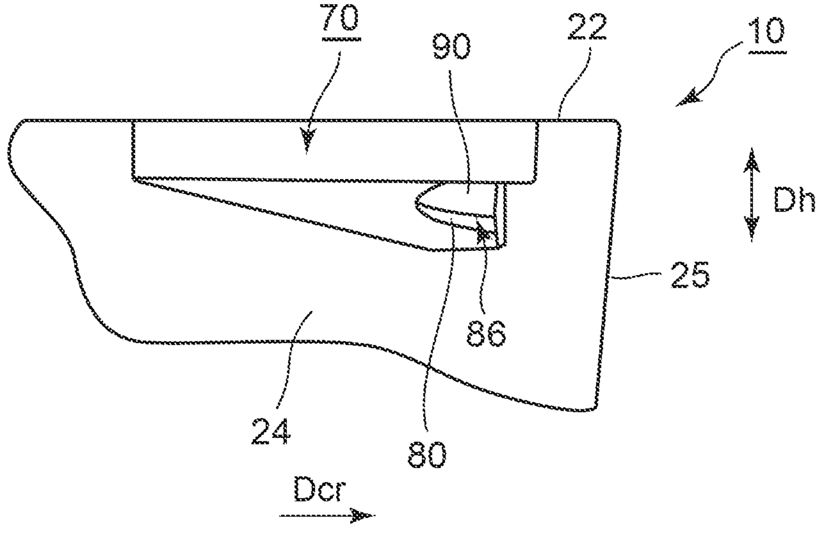
FIG. 5 is a plan view of the blade tip of the rotor blade in the embodiment on the leading edge side when viewed from downstream in an axial direction.
Figure 6:
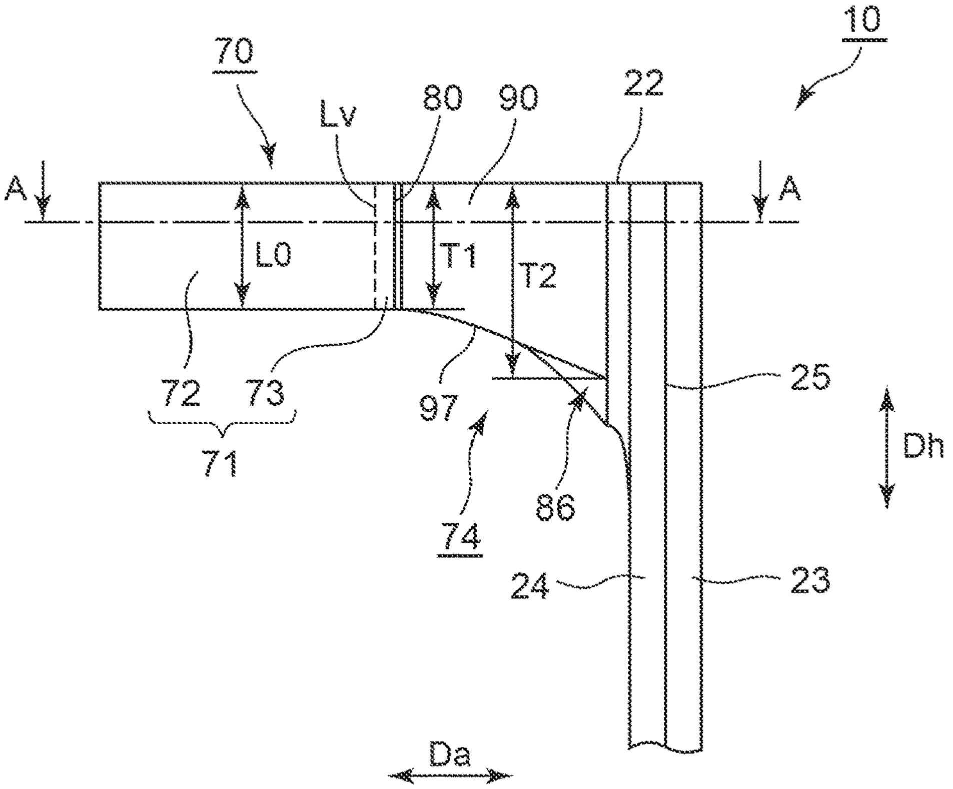
FIG. 6 is a plan view of the blade tip of the rotor blade in the embodiment on the leading edge side when viewed from upstream in a rotation direction.
Figure 7:
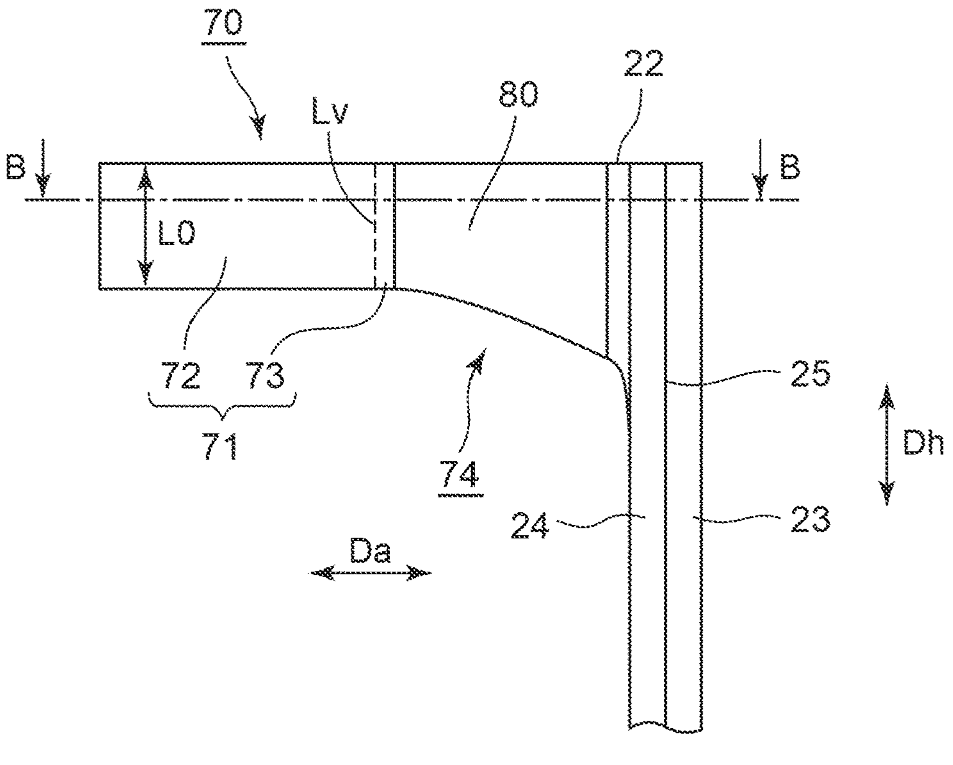
FIG. 7 is a plan view of the blade tip of the rotor blade in the embodiment on the leading edge side with no joining member joined thereto when viewed from upstream in the rotation direction.

FIG. 4 is a plan view of the blade tip 22 of the rotor blade 10 in the embodiment when viewed from the outer periphery side. FIG. 5 is a plan view of the blade tip 22 of the rotor blade 10 in the embodiment on the leading edge side when viewed from downstream in the axial direction Da. FIG. 6 is a plan view of the blade tip 22 of the rotor blade 10 in the embodiment on the leading edge side when viewed from upstream in the rotation direction Dcr. FIG. 7 is a plan view of the blade tip 22 of the rotor blade 10 in the embodiment on the leading edge side with no joining member 90 joined thereto when viewed from upstream in the rotation direction Dcr. FIG. 5 to FIG. 7 each illustrate a partial configuration of the rotor blade 10.

Figure 8:
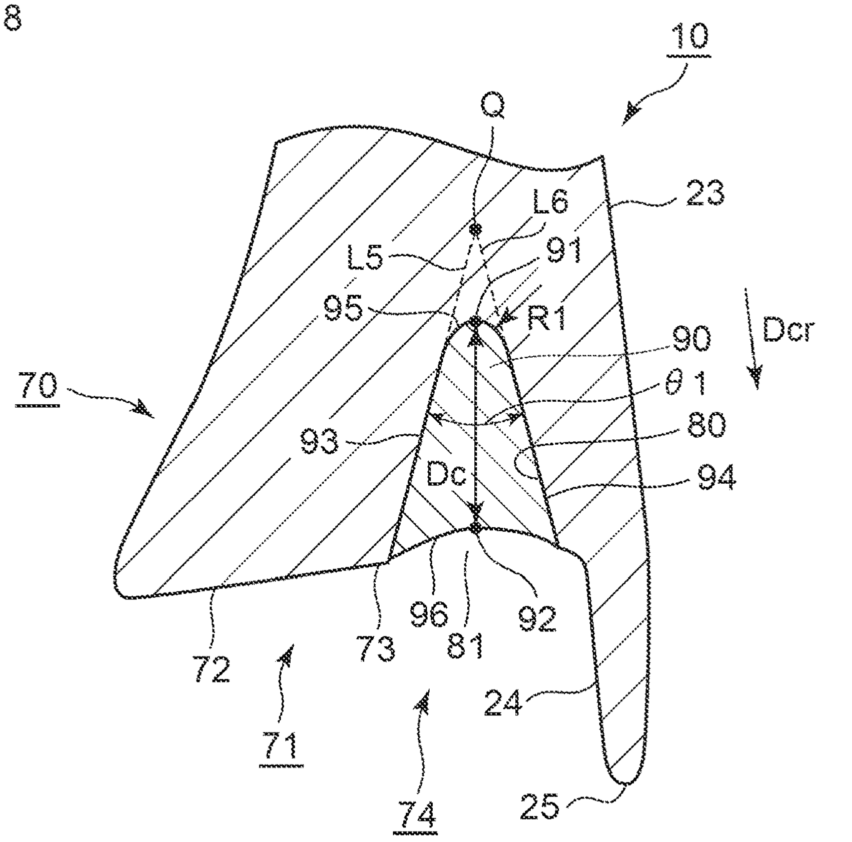
FIG. 8 is a view illustrating a cross section taken along A-A in FIG. 6.
Figure 9:
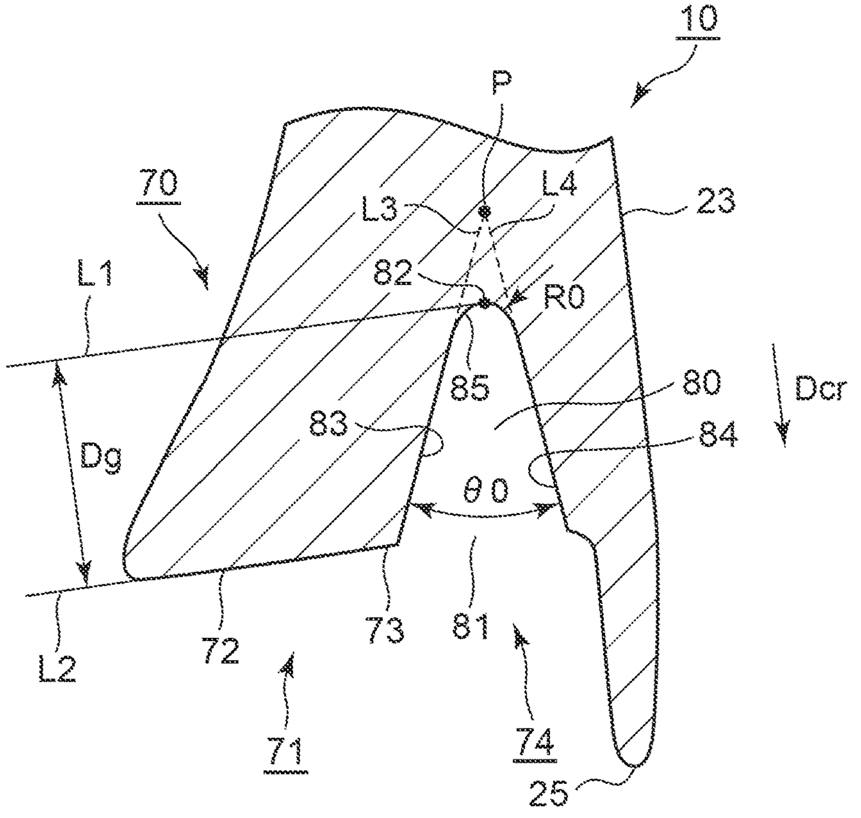
FIG. 9 is a view illustrating a cross section taken along B-B in FIG. 7.

FIG. 8 is a view illustrating a cross section taken along A-A in FIG. 6. FIG. 9 is a view illustrating a cross section taken along B-B in FIG. 7. FIG. 8 and FIG. 9 each illustrate a cross section vertical to the blade height direction Dh at the blade tip 22 of the blade effective portion 20.

Figure 10:
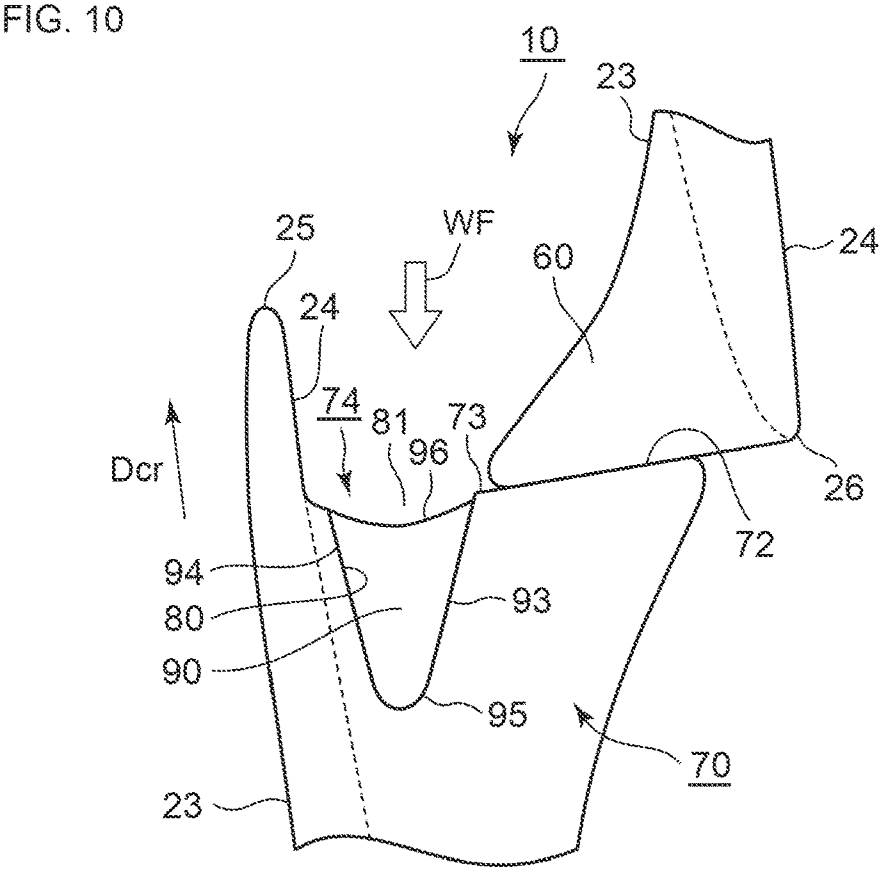
FIG. 10 is a plan view of the blade tips of the rotor blades in the embodiment during rotation, when viewed from the outer periphery side.
Figure 11:
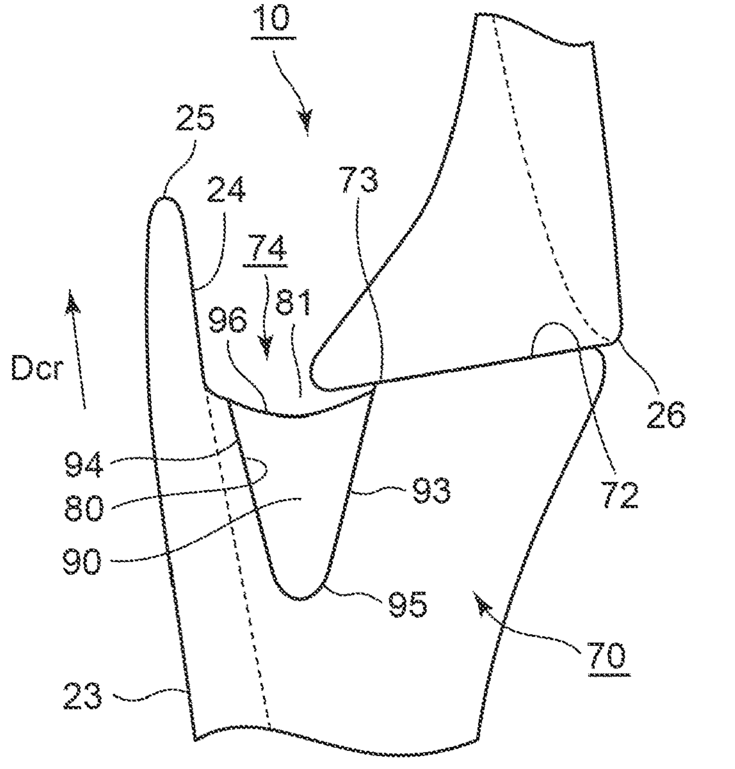
FIG. 11 is a plan view of the blade tips of the rotor blades in the embodiment at the time of assembly, when viewed from the outer periphery side.
Figure 12:
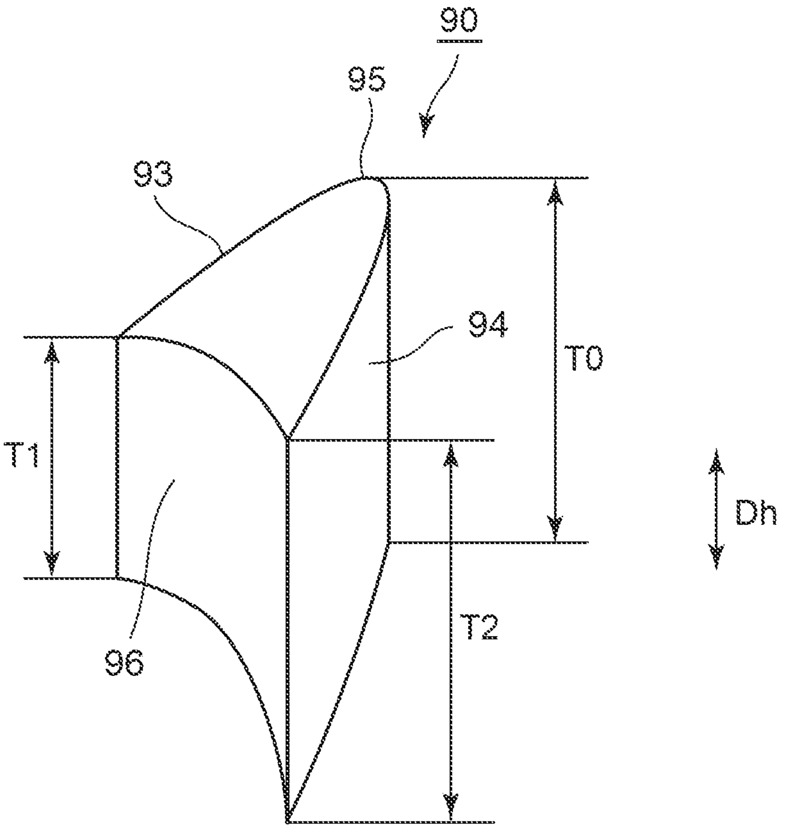
FIG. 12 is a perspective view of a joining member that the rotor blade in the embodiment includes.

FIG. 10 is a plan view of the blade tips 22 of the rotor blades 10 in the embodiment during rotation, when viewed from the outer periphery side. FIG. 11 is a plan view of the blade tips 22 of the rotor blades 10 in the embodiment at the time of assembly, when viewed from the outer periphery side. FIG. 12 is a perspective view of the joining member 90 that the rotor blade 10 in the embodiment includes. FIG. 10 illustrates the flow of a working fluid WF by an arrow.

As illustrated in FIG. 2 to FIG. 4, the projecting portion 50 is formed at the blade tip 22 of the blade effective portion 20. The projecting portion 50 includes a pressure surface side projecting portion 60 and a suction surface side projecting portion 70. The projecting portion 50 is sometimes referred to as a snubber, here. The projecting portion 50 is formed integrally with the blade effective portion 20, for example.

As illustrated in FIG. 4, the pressure surface side projecting portion 60 projects from the pressure surface 23 on the trailing edge side at the blade tip 22 of the blade effective portion 20. Specifically, the pressure surface side projecting portion 60 projects from the pressure surface 23 on the trailing edge side while gradually widening to the upstream side in the axial direction Da as it goes to the trailing edge side.

At the pressure surface side projecting portion 60, the projecting height from the pressure surface 23 to the upstream side is the maximum at the position of the trailing edge 26. The pressure surface side projecting portion 60 is provided at a part on the trailing edge side of the pressure surface 23 of the blade tip 22.

Further, a trailing edge side end surface 61 of the pressure surface side projecting portion 60 on the trailing edge side is formed of a flat surface. A part of the trailing edge side end surface 61 comes into contact with a part of a leading edge side end surface 71 of the suction surface side projecting portion 70 on the leading edge side (a contact surface 72) during rotation of the rotor blades 10.

As illustrated in FIG. 4, the suction surface side projecting portion 70 projects from the suction surface 24 on the leading edge side at the blade tip 22 of the blade effective portion 20. Specifically, the suction surface side projecting portion 70 projects from the suction surface 24 on the leading edge side while gradually widening to the downstream side in the axial direction Da as it goes to the leading edge side.

At the suction surface side projecting portion 70, the projecting height from the suction surface 24 to the downstream side is the maximum at the position of the most leading edge side. The suction surface side projecting portion 70 is provided at a part on the leading edge side of the suction surface 24 of the blade tip 22.

Further, as illustrated in FIG. 5, the suction surface side projecting portion 70 has a portion that widens to the blade root side of the blade effective portion 20 as it goes to the leading edge side. That is, the suction surface side projecting portion 70 of this portion increases in thickness in the blade height direction Dh to the blade root side as it goes to the leading edge side.

Further, as illustrated in FIG. 5 and FIG. 7, the suction surface side projecting portion 70 has a portion that widens to the blade root side of the blade effective portion 20 as it goes to the suction surface side. That is, the suction surface side projecting portion 70 of this portion increases in thickness in the blade height direction Dh to the blade root side as it goes to the suction surface side.

That is, the suction surface side projecting portion 70 has a portion that widens to the blade root side of the blade effective portion 20 as it goes to the leading edge side, and also widens to the blade root side of the blade effective portion 20 as it goes to the suction surface side.

As illustrated in FIG. 6 to FIG. 9, the suction surface side projecting portion 70 includes the leading edge side end surface 71 on the leading edge side. The leading edge side end surface 71 is an upstream end surface facing the direction of collision with the working fluid.

As illustrated in FIG. 10, for example, the leading edge side end surface 71 includes the contact surface 72 that comes into contact with the pressure surface side projecting portion 60 of the adjacent rotor blade 10 during rotation of the rotor blades 10, and a non-contact surface 73 that does not come into contact with the pressure surface side projecting portion 60 of the adjacent rotor blade 10 during rotation of the rotor blades 10. Each dotted line illustrated in the leading edge side end surface 71 in FIG. 6 and FIG. 7 is a virtual boundary line Lv between the contact surface 72 and the non-contact surface 73. Further, in the leading edge side end surface 71, the non-contact surface 73 is a surface on the suction surface side with respect to the virtual boundary line Lv.

As illustrated in FIG. 10, during rotation of the rotor blades 10, the contact surface 72 of the suction surface side projecting portion 70 and a part of the trailing edge side end surface 61 of the pressure surface side projecting portion 60 of the adjacent rotor blade 10 come into contact, and thereby the rotor blade cascade including the rotor blades 10 is brought into a whole-periphery single-unit coupled structure.

As illustrated in FIG. 6 and FIG. 7, a thickness L0 of the contact surface 72 in the blade height direction Dh is substantially constant over the projecting direction (axial direction Da). On the other hand, the non-contact surface 73 gradually widens to the blade root side as it goes to the suction surface side. The suction surface side projecting portion 70 including this non-contact surface 73 is a portion that widens to the blade root side of the blade effective portion 20 as it goes to the suction surface side as described previously.

That is, in the non-contact surface 73, the thickness in the blade height direction Dh increases as it goes to the suction surface side from the contact surface side. Therefore, in the non-contact surface 73, the thickness in the blade height direction Dh on the suction surface side is thicker than that in the blade height direction Dh on the contact surface side.

Here, on the leading edge side of the suction surface side projecting portion 70, a projecting portion having the non-contact surface 73 on the suction surface side is referred to as a root portion 74.

Further, as illustrated in FIG. 5 to FIG. 9, the suction surface side projecting portion 70 includes a groove portion 80. Further, as illustrated in FIG. 7 and FIG. 9, the groove portion 80 is formed from the non-contact surface 73 to the trailing edge side and penetrates the suction surface side projecting portion 70 in the blade height direction Dh. Further, the groove portion 80 is a tapered depression that narrows in width in the projecting direction (axial direction Da) as it goes to the trailing edge side.

The groove portion 80 is formed in a portion of the suction surface side projecting portion 70 that widens to the blade root side of the blade effective portion 20 as it goes to the leading edge side and also widens to the blade root side of the blade effective portion 20 as it goes to the suction surface side. Therefore, the groove portion 80 has a shape that widens to the blade root side of the blade effective portion 20 as it goes to the leading edge side and also widens to the blade root side of the blade effective portion 20 as it goes to the suction surface side.

As illustrated in FIG. 9, both side surfaces 83 and 84 of the groove portion 80 are each formed of a flat surface, and a tip portion 85 is formed of a curved surface. Here, a curvature radius of the curved surface of the tip portion 85 of the groove portion 80 is defined as R0.

An opening 81 of the groove portion 80 is formed in the non-contact surface 73. Therefore, as illustrated in FIG. 10, during rotation of the rotor blades 10, the pressure surface side projecting portion 60 of the adjacent rotor blade 10 does not reach the opening 81.

Here, a depth Dg of the groove portion 80 to the trailing edge side and a groove angle θ0 of the groove portion 80 are explained with reference to FIG. 9.

A straight line passing through a tip portion 82 of the groove portion 80 on the most trailing edge side and parallel to the contact surface 72 is defined as virtual line L1. An extension line of the contact surface 72 is defined as a virtual line L2. Here, the depth Dg of the groove portion 80 is defined as the distance between the virtual line L1 and the virtual line L2.

An extension line of one side surface 83 of the groove portion 80 is defined as a virtual line L3. An extension line of the other side surface 84 of the groove portion 80 is defined as a virtual line L4. A point where the virtual line L3 and the virtual line L4 intersect is defined as a point P. Here, the groove angle θ0 of the groove portion 80 is defined as the angle between the side surface 83 and the side surface 84 centered on the point P.

The joining member 90 is joined to the above-described groove portion 80 as illustrated in FIG. 6 and FIG. 8. The joining member 90 has a shape that fits into the groove portion 80. Then, the shape of the joining member 90 is set to correspond to the shape of the groove portion 80. Similar to the shape of the groove portion 80, the shape of the joining member 90 is also tapered, with the width in the projecting direction (axial direction Da) to narrow as it goes to the trailing edge side.

As illustrated in FIG. 8, both side surfaces 93 and 94 of the joining member 90 are each formed of a flat surface, and a tip portion 95 is formed of a curved surface. Here, a curvature radius of the curved surface of the tip portion 95 of the joining member 90 is defined as R1.

An end surface 96 of the joining member 90 on the leading edge side has a shape that is concave in the middle, for example, as illustrated in FIG. 8. This end surface 96 is set to be located more on the trailing edge side than an opening surface of the groove portion 80. That is, the joining member 90 does not project to the leading edge side from the opening surface of the groove portion 80. In other words, the joining member 90 does not project to the leading edge side from the leading edge side end surface 71 and the non-contact surface 73.

Here, a length of the joining member 90 to the trailing edge side (a trailing edge side length Dc of the joining member 90) and a taper angle θ1 of the joining member 90 are explained with reference to FIG. 8.

The tip of the joining member 90 on the most trailing edge side is set as a tip portion 91. In the end surface 96 of the joining member 90 on the leading edge side, the position of the end surface that is concave to the most trailing edge side in the middle is set as a concave portion 92. Here, the trailing edge side length Dc of the joining member 90 is defined as the distance between the tip portion 91 and the concave portion 92.

An extension line of one side surface 93 of the joining member 90 is defined as a virtual line L5. An extension line of the other side surface 94 of the joining member 90 is defined as a virtual line L6. A point where the virtual line L5 and the virtual line L6 intersect is defined as a point Q. Here, the taper angle θ1 of the joining member 90 is defined as the angle between the side surface 93 and the side surface 94 centered on the point Q.

Further, the joining member 90 is formed of a material more excellent in erosion resistance than the material forming the rotor blade 10. The joining member 90 is formed of a material higher in hardness than the material forming the rotor blade 10. Specifically, the joining member 90 is formed of Stellite (registered trademark), which is a Co-based alloy, for example, or the like.

The joining member 90 is joined to the groove portion 80 by brazing or TIG welding. Examples of a brazing material used for brazing include a silver brazing material, and so on.

On the outer peripheral surface of the suction surface side projecting portion 70 on the radially outer side Dro, the surface of the suction surface side projecting portion 70 and the surface of the joining member 90 are located on the same surface, as illustrated in FIG. 6. That is, when the joining member 90 is joined to the groove portion 80, the joining member 90 does not project to the outer side (radially outer side Dro) in the blade height direction Dh from the groove portion 80.

Here, when Stellite is used as the material of the joining member 90, Stellite is higher in hardness than the material forming the rotor blade 10 and is excellent in sliding wear properties. Therefore, during rotation of the rotor blades 10, the pressure surface side projecting portion 60 is worn away when the joining member 90 comes into contact with the pressure surface side projecting portion 60 of the adjacent rotor blade 10, for example.

However, as described above, the opening 81 of the groove portion 80 is formed in the non-contact surface 73. Therefore, during rotation of the rotor blades 10, the pressure surface side projecting portion 60 of the adjacent rotor blade 10 does not reach the opening 81 as illustrated in FIG. 10. Further, the end surface 96 of the joining member 90 is located more on the trailing edge side than the opening 81 of the groove portion 80. From the above, in the rotor blade 10, the joining member 90 does not wear the pressure surface side projecting portion 60 of the adjacent rotor blade 10.

Here, the trailing edge side length Dc of the joining member 90 is set to be equal to or less than the depth Dg of the groove portion 80.

The trailing edge side length Dc of the joining member 90 is defined based on the concave portion 92 of the end surface 96, which is concave to the most trailing edge side in the middle. Even in this case, the end surface 96 of the joining member 90 on the side surface side does not project to the leading edge side from the opening surface of the groove portion 80.

Further, at the time of assembly when no centrifugal stress is applied, as illustrated in FIG. 11, the pressure surface side projecting portion 60 of the adjacent rotor blade 10 is brought into a state of covering a part of the opening 81 of the groove portion 80.

However, the trailing edge side length Dc of the joining member 90 is set to be equal to or less than the depth Dg of the groove portion 80, which does not make the joining member 90 come into contact with the pressure surface side projecting portion 60. Therefore, it is possible to efficiently advance assembly workability.

As described previously, the joining member 90 is formed in a tapered shape to correspond to the shape of the groove portion 80. By making the shape of the joining member 90 correspond to the shape of the groove portion 80, the joining member 90 fitted into the groove portion 80 inhibits shrinkage and deformation of the groove portion 80 caused by heat input during joining. Therefore, the deformation of the suction surface side projecting portion 70 in which the groove portion 80 is formed is inhibited.

Further, the taper angle θ1 of the joining member 90 is preferably set to be equal to the groove angle θ0 of the groove portion 80. This allows the gap between the side surface 93 of the joining member 90 and the side surface 83 of the groove portion 80 and the gap between the side surface 94 of the joining member 90 and the side surface 84 of the groove portion 80 (each to be referred to as a gap between side surfaces, below) to be equal.

Here, the gap between side surfaces is preferably set to 0.2 mm or less.

When the joining member 90 is joined to the groove portion 80 by brazing, setting the gap between side surfaces to 0.2 mm or less allows a molten brazing material (for example, silver brazing material) to properly diffuse by capillary action. When the joining member 90 is joined to the groove portion 80 by brazing, the gap between side surfaces is more preferably set to 0.10 to 0.15.

When the joining member 90 is joined to the groove portion 80 by TIG welding, setting the gap between side surfaces to 0.2 mm or less makes it possible to improve welding workability. When the joining member 90 is joined to the groove portion 80 by TIG welding, the gap between side surfaces is preferably as small as possible. That is, the gap between side surfaces may be "0."

As described above, setting the taper angle θ1 of the joining member 90 to be equal to the groove angle θ0 of the groove portion 80 and making the gap between side surfaces fall within the above-described range not only improve a joining property, but also improve the effect of inhibiting the shrinkage and deformation of the groove portion 80 caused by heat input during joining of the joining member 90.

Further, the curvature radius R0 of the curved surface at the tip portion 85 of the groove portion 80 and the curvature radius R1 of the curved surface at the tip portion 95 of the joining member 90 preferably satisfy the following relational expression (1).

$$(R0-R1)\leq 0.20 \qquad \text{Expression (1)}$$

When the joining member 90 is joined to the groove portion 80 by brazing, by satisfying the above-described expression (1), the molten brazing material (for example, silver brazing material) is diffused appropriately by capillary action. When the joining member 90 is joined to the groove portion 80 by brazing, (R0−R1) is more preferred to be 0.10 to 0.15.

When the joining member 90 is joined to the groove portion 80 by TIG welding, satisfying the above-described expression (1) makes it possible to improve the welding workability. When the joining member 90 is joined to the groove portion 80 by TIG welding, (R0−R1) is preferred to be as small as possible. That is, (R0−R1) may be "0."

Satisfying the above-described expression (1) not only improves the joining property, but also obtains the improvement in the effect of inhibiting the shrinkage and deformation of the groove portion 80 caused by heat input during joining of the joining member 90.

As described previously, the shape of the joining member 90 is set to correspond to the shape of the groove portion 80. Thus, as illustrated in FIG. 6, the joining member 90 is preferably formed so as to increase in thickness in the blade height direction Dh to the root side of the blade effective portion 20 as it goes to the suction surface side from the contact surface side. That is, a lower surface of the joining member 90 (lower surface in the blade height direction Dh) is preferably formed so as to slope and widen to the root side of the blade effective portion 20 as it goes to the suction surface side from the contact surface side.

Further, the joining member 90 is preferably formed so as to increase in thickness in the blade height direction Dh to the root side of the blade effective portion 20 as it goes to the trailing edge side. That is, the lower surface of the joining member 90 (lower surface in the blade height direction Dh) is preferably formed so as to slope and widen to the root side of the blade effective portion 20 as it goes to the trailing edge side.

That is, the joining member 90 preferably includes the shape that widens to the blade root side of the blade effective portion 20 as it goes to the trailing edge side and also widens to the blade root side of the blade effective portion 20 as it goes to the suction surface side.

From the above, as illustrated in FIG. 12, for example, at the end surface 96 of the joining member 90 on the leading edge side, a thickness T2 of the joining member 90 on the suction surface side in the blade height direction Dh is thicker than a thickness T1 of the joining member 90 on the contact surface side in the blade height direction Dh. A thickness T0 of the joining member 90 at the tip on the trailing edge side is thicker than the thickness T1. Further, the thickness T2 is equal to or larger than the thickness TO. Here, the thickness T0 is set to be equal to or smaller than the depth of the groove in the blade height direction Dh at the tip of the groove portion 80 at the trailing edge side. The thickness T2 is set to be equal to or smaller than the depth of the groove in the blade height direction Dh on the most leading edge side and the most suction surface side of the groove portion 80.

Further, as illustrated in FIG. 6, the thickness T1 and the thickness T2 are thicker than the thickness L0 of the contact surface 72 in the blade height direction Dh. The thickness T0 is thicker than the thickness L0 of the contact surface 72 in the blade height direction Dh.

Here, during rotation of the rotor blades 10, in addition to a contact reaction force from the pressure surface side projecting portion 60, a moment load caused by a centrifugal stress of the suction surface side projecting portion 70 acts on a joint portion between the joining member 90 and the groove portion 80. The moment load acts in the direction of removing the joining member 90 in a lower region of the suction surface side projecting portion 70 in the blade height direction Dh.

Thus, the joining member 90 is formed in a shape to increase in thickness in the blade height direction Dh to the root side of the blade effective portion 20 as it goes to the suction surface side from the contact surface side, and thereby the stress concentration in the lower region of the suction surface side projecting portion 70 is alleviated.

Further, the thickness of the joining member 90 is made thicker than the thickness L0 of the contact surface 72 in the blade height direction Dh, thereby making it possible to improve the strength against the contact reaction force from the pressure surface side projecting portion 60.

Although the shape of the joining member 90 can be made to have a constant thickness in the blade height direction Dh as it goes to the suction surface side from the contact surface side, for the above-described reasons, the joining member 90 is preferably formed in a shape to increase in thickness in the blade height direction Dh to the root side of the blade effective portion 20 as it goes to the suction surface side from the contact surface side.

Figure 13:
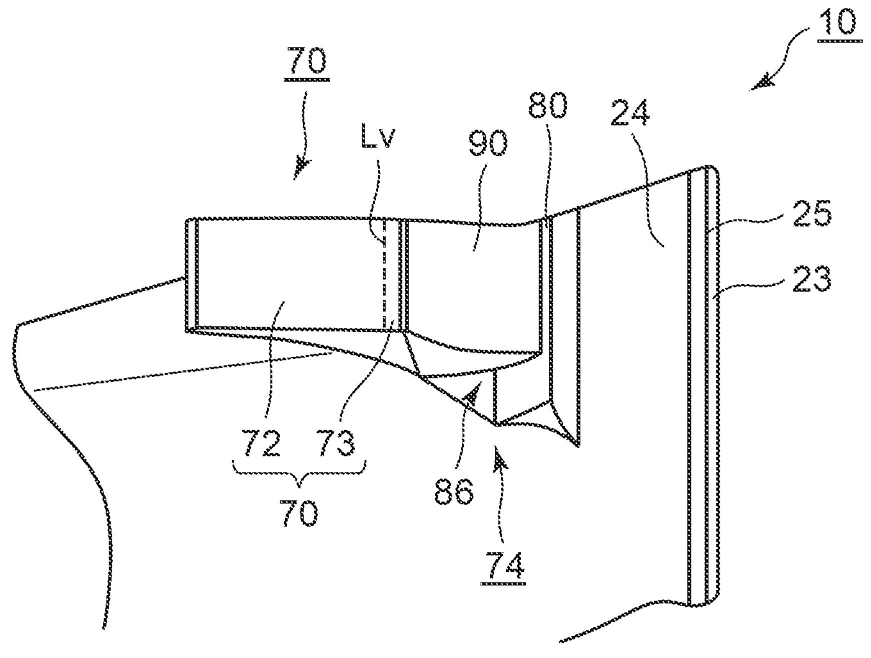
FIG. 13 is a perspective view of the blade tip of the rotor blade in the embodiment on the leading edge side when viewed from diagonally downward on the upstream side in the rotation direction.
Figure 14:
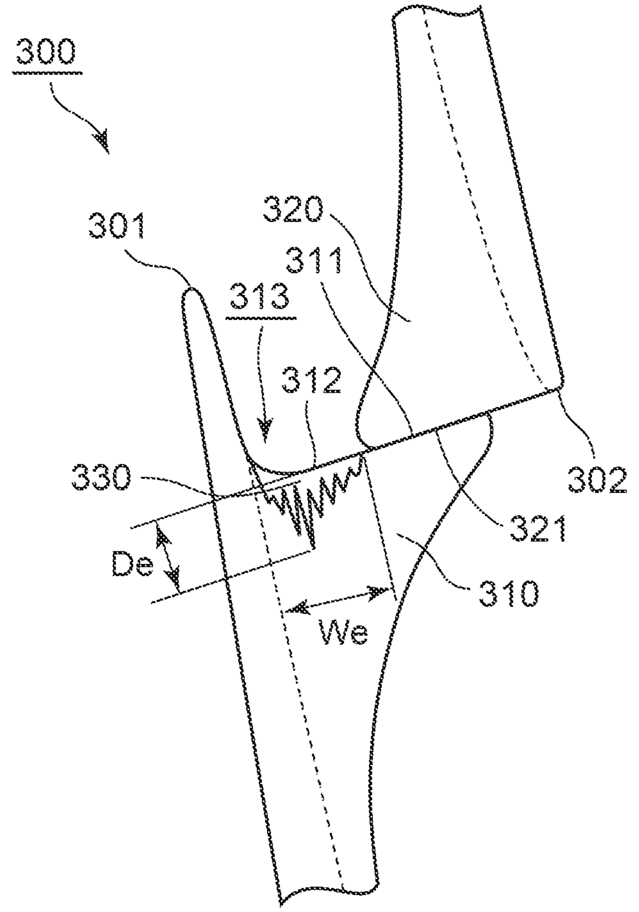
FIG. 14 is a plan view of a part of tips of rotor blades in the final stage in a conventional low-pressure turbine when viewed from the outer periphery side.

FIG. 13 is a perspective view of the blade tip 22 of the rotor blade 10 in the embodiment on the leading edge side when viewed from diagonally downward on the upstream side in the rotation direction Dcr.

When the above-described joining member 90 is joined to the groove portion 80, as illustrated in FIG. 13, on the lower side of the groove portion 80 in the blade height direction Dh, a space region 86 where the groove portion 80 is not filled by the joining member 90 is present. That is, on the lower side of the groove portion 80 in the blade height direction Dh, the space region 86 that is not filled by the joining member 90 is present.

Thus, the shape of the joining member 90 on the lower side in the blade height direction Dh may be formed in a shape to fill the space region 86. As a result, the shape of the root portion 74 of the suction surface side projecting portion 70 becomes substantially the same as the shape of the root portion 74 without the groove portion 80 being formed. By forming the joining member 90 into this shape, the stress concentration in the lower region of the suction surface side projecting portion 70 can be further alleviated.

Here, the configuration of the rotor blade 10 in the above-described embodiment can be applied to new rotor blades (new blades) and used rotor blades (used blades). Examples of the used blade include a rotor blade with the eroded root portion 74 of the suction surface side projecting portion 70, and so on.

Here, when the configuration of the rotor blade 10 in the embodiment is applied to a new blade, a blade main body including the blade effective portion 20, the blade implantation portion 40, and the projecting portion 50 is first formed by casting.

At this time, the groove portion 80 in the suction surface side projecting portion 70 of the projecting portion 50 may be formed during casting. Further, the groove portion 80 in the suction surface side projecting portion 70 may be formed by machining after the blade main body is cast.

Then, the joining member 90 is formed by casting or machining. In machining, the joining member 90 is formed by cutting a block-shaped material.

Then, the joining member 90 is fitted into the groove portion 80 in the suction surface side projecting portion 70 to be joined. The joining member 90 is joined to the groove portion 80 by brazing or TIG welding. When joining, the joining member 90 inhibits the shrinkage and deformation of the groove portion 80 caused by heat input during joining.

On the other hand, when the configuration of the rotor blade 10 in the embodiment is applied to a used blade, an eroded portion in the root portion 74 of the suction surface side projecting portion 70 is first removed by machining. Thereby, the groove portion 80 is formed in the root portion 74.

Then, the joining member 90 is formed by casting or machining. The joining member 90 is formed to correspond to the shape of the machined groove portion 80.

Then, as in the case of the new blade, the joining member 90 is fitted into the groove portion 80 in the suction surface side projecting portion 70 to be joined.

In this manner, the rotor blade 10 in the embodiment is manufactured.

In the above-described rotor blade 10, as illustrated in FIG. 10, it is the end surface 96 of the joining member 90 that collides with the working fluid WF containing droplets at the leading edge side end surface 71 of the suction surface side projecting portion 70 when the projecting portions 50 are brought into a whole-periphery single-unit coupled structure during rotation.

As above, in the rotor blade 10 in the above-described embodiment, the joining member 90 excellent in erosion resistance is provided in the root portion 74 of the suction surface side projecting portion 70 with which the working fluid WF collides, thereby making it possible to inhibit the erosion in the root portion 74 caused by droplet erosion.

Further, the rotor blade 10 has a configuration in which a portion of the root portion 74 of the suction surface side projecting portion 70, which is to be eroded, is replaced with the joining member 90. As a result, the erosion of the suction surface side projecting portion 70 itself, excluding the joining member 90, hardly occurs in the root portion 74.

Therefore, for example, when the joining member 90 has been eroded by long-term use, only the joining member 90 can be replaced. This enables extension of the usable life of the rotor blade 10, which makes the use of the rotor blade 10 economical. Further, replacement of the joining member 90 can be performed easily.

When the configuration in the embodiment is applied to the new blade, it is possible to provide the rotor blade 10 that is capable of inhibiting the erosion in the root portion 74 of the suction surface side projecting portion 70 caused by droplet erosion.

When the configuration in the embodiment is applied to the used blade, only the eroded root portion 74 of the suction surface side projecting portion 70 is replaced with the joining member 90, and thereby the usable portion other than the root portion 74 can be used continuously. That is, the used blade can be repaired and used without replacing it with a new blade. This enables shortening of the time required for maintenance work on the rotor blade 10. In addition, the repaired used blade has the function of inhibiting erosion in the root portion 74.

According to the embodiment explained above, it is possible to extend the usable life while inhibiting the erosion in the root portion 74 of the suction surface side projecting portion at the blade tip.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A turbine rotor blade, comprising:

a blade effective portion including a leading edge and a trailing edge at a boundary between a suction surface and a pressure surface;

a suction surface side projecting portion projecting from the suction surface on a leading edge side at a tip of the blade effective portion; and a pressure surface side projecting portion projecting from the pressure surface on a trailing edge side at the tip of the blade effective portion, wherein the suction surface side projecting portion includes:

a leading edge side end surface on the leading edge side, including a contact surface and a non-contact surface, which contacts with the pressure surface side projecting portion of the adjacent turbine blade on the contact surface during rotation;

a groove portion formed from the non-contact surface to the trailing edge side, the groove portion penetrating the suction surface side projecting portion in a blade height direction, the groove portion being a tapered depression that narrows in width in the projecting direction toward the trailing edge side; and a joining member configured to be joined to the groove portion, the joining member being formed of a tapered block member that narrows in width in the projecting direction toward the trailing edge side, the joining member having a shape that fits into the groove portion, the joining member being formed of a material that is better in erosion resistance than a material forming the turbine rotor blade, wherein the groove portion is a groove for fitting and joining the joining member and the groove portion is a groove for being filled with the joining member, wherein a trailing edge side length of the joining member is equal to a depth of the groove portion, wherein the joining member is bounded both radially and axially by the groove portion.

2. The turbine rotor blade according to claim 1, wherein the non-contact surface increases in thickness in the blade height direction to a root side of the blade effective portion as it goes to the suction surface side from a boundary with the contact surface.

3. The turbine rotor blade according to claim 1, wherein an end surface of the joining member on the leading edge side is located more on the trailing edge side than the leading edge side end surface.

4. The turbine rotor blade according to claim 1, wherein the joining member increases in thickness in the blade height direction to a root side of the blade effective portion as it goes to the suction surface side from the contact surface side.

5. The turbine rotor blade according to claim 1, wherein the joining member increases in thickness in the blade height direction to a root side of the blade effective portion as it goes to the trailing edge side.

6. The turbine rotor blade according to claim 1, wherein the thickness of the joining member in the blade height direction on the contact surface side at an end surface on the leading edge side is thicker than the thickness of the contact surface in the blade height direction.

7. The turbine rotor blade according to claim 1, wherein in a cross section vertical to the blade height direction at the tip of the blade effective portion, an angle between both side surfaces of the groove portion centered on the point where virtual extension lines of the both surfaces of the groove portion intersect is equal to an angle between both side surfaces of the joining member centered on the point where virtual extension lines of the both side surfaces of the joining member intersect.

8. The turbine rotor blade according to claim 1, wherein in a cross section vertical to the blade height direction at the tip of the blade effective portion, a tip portion of the groove portion on the trailing edge side is formed of a curved surface, a tip portion of the joining member on the trailing edge side is formed of a curved surface, and a curvature radius R1 of the curved surface at the tip portion of the joining member is smaller than a curvature radius R0 of the curved surface at the tip portion of the groove portion.

9. The turbine rotor blade according to claim 8, wherein the curvature radius R0 and the curvature radius R1 satisfy the relation of $(R0-R1)\leq 0.20$.

* * * * *